(12) United States Patent
Wang et al.

(10) Patent No.: US 9,631,143 B2
(45) Date of Patent: Apr. 25, 2017

(54) LIQUID CRYSTAL FILM, METHOD FOR PREPARING THE FILM, TEMPERATURE-RESPONSIVE DEVICE COMPRISING THE FILM, AND CIRCULAR POLARIZER MADE THEREFROM

(71) Applicants: BOE TECHNOLOGY GROUP CO., LTD., Beijing (CN); BEIJING BOE DISPLAY TECHNOLOGY CO., LTD., Beijing (CN)

(72) Inventors: Feifei Wang, Beijing (CN); Xibin Shao, Beijing (CN); Dan Wang, Beijing (CN); Seungmin Lee, Beijing (CN); Honglin Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 34 days.

(21) Appl. No.: 14/529,597

(22) Filed: Oct. 31, 2014

(65) Prior Publication Data
US 2015/0353828 A1  Dec. 10, 2015

(30) Foreign Application Priority Data
Jun. 9, 2014  (CN) .......................... 2014 1 0253608

(51) Int. Cl.
*C09K 19/52* (2006.01)
*C09K 19/20* (2006.01)
(Continued)

(52) U.S. Cl.
CPC .......... *C09K 19/50* (2013.01); *C09K 19/2021* (2013.01); *C09K 19/36* (2013.01);
(Continued)

(58) Field of Classification Search
CPC ...... C09K 19/50; C09K 19/36; C09K 19/601; C09K 19/586; C09K 2219/03;
(Continued)

(56) References Cited

FOREIGN PATENT DOCUMENTS

CN       1776483 A    5/2006
CN    101148591 A    3/2008
(Continued)

OTHER PUBLICATIONS

English translation of CN 1776483 (2006) provided by Espacnet.*
(Continued)

*Primary Examiner* — Shean C Wu
(74) *Attorney, Agent, or Firm* — Nath, Goldberg & Meyer; Joshua B. Goldberg (57) ABSTRACT

The present invention relates to a composite material, a liquid crystal film, a method for preparing the film, a temperature-responsive device comprising the film, and a circular polarizer made therefrom. The liquid crystal film comprises the composite material of the present invention, wherein the composite material comprises a polymer network of a cholesteric liquid crystal material, and a chiral material capable of hydrogen-bond-assisted self-assembly, and wherein the chiral material is dispersed in and restrained by the polymer network. The obtained liquid crystal film can exhibit a high reflectivity and a high transmittance as well as a broad band reflection. And, the liquid crystal film is applicable for an industrial development because it can be produced with a simple process and at a lower cost, and requires a lower UV luminous intensity.

18 Claims, 2 Drawing Sheets

(51) Int. Cl.
*C09K 19/32* (2006.01)
*C09K 19/58* (2006.01)
*C09K 19/50* (2006.01)
*C09K 19/36* (2006.01)
*C09K 19/60* (2006.01)
*G02F 1/13* (2006.01)
*C09K 19/04* (2006.01)

(52) U.S. Cl.
CPC ............ *C09K 19/52* (2013.01); *C09K 19/586* (2013.01); *C09K 19/588* (2013.01); *C09K 19/601* (2013.01); *G02F 1/132* (2013.01); *C09K 2019/0448* (2013.01); *C09K 2019/0492* (2013.01); *C09K 2019/2035* (2013.01); *C09K 2019/2042* (2013.01); *C09K 2019/2078* (2013.01); *C09K 2019/323* (2013.01); *C09K 2219/03* (2013.01)

(58) Field of Classification Search
CPC .. C09K 19/2021; C09K 19/52; C09K 19/588; C09K 2019/0448; C09K 2019/0492; C09K 2019/2035; C09K 2019/2042; C09K 2019/2078; C09K 2019/323; G02F 1/132

See application file for complete search history.

(56) References Cited

FOREIGN PATENT DOCUMENTS

| | | |
|---|---|---|
| CN | 101167003 A | 4/2008 |
| CN | 101427162 A | 5/2009 |
| CN | 101671565 A | 3/2010 |
| JP | 2002235085 A | 8/2002 |

OTHER PUBLICATIONS

English translation of CN 101671565 (2010) provided by Espacenet.*
Notification of the First Office Action dated May 6, 2015 corresponding to Chinese application No. 201410253608.5.

* cited by examiner

LIQUID CRYSTAL FILM, METHOD FOR PREPARING THE FILM, TEMPERATURE-RESPONSIVE DEVICE COMPRISING THE FILM, AND CIRCULAR POLARIZER MADE THEREFROM

FIELD OF THE INVENTION

The present invention belongs to a technical field of a liquid crystal display. Specifically, the present invention relates to a liquid crystal (LC) film, a method for preparing the film, a temperature-responsive device and a circular polarizer.

BACKGROUND OF THE INVENTION

A cholesteric LC can be obtained by incorporating a chiral additive into a nematic LC. In the cholesteric LC, the long axes of rod-like LC molecules twist around a helixcal axis sequentially, and thus the cholesteric LC has a helical structure. The chiral pitch, P, refers to the distance over which the LC molecules undergo a full 360° twist. P varies inversely proportionally with the amount of the chiral additive in a LC. A cholesteric LC can exhibit a special optical property of selective Bragg reflection due to the helical structure thereof. A cholesteric LC having a single pitch can reflect a light having a certain wavelength, satisfying with the equation: $\Delta\lambda=\Delta nP$, wherein $\Delta n$ represents the refractive index of birefringence. In a reflection wave range, the incident light at an optical rotary direction same as the twisting direction of the helical structure of the cholesteric LC, can be reflected; while the incident light, which has a inverse optical rotary direction with respect to the twisting direction of the helical structure of the cholesteric LC, can be transmitted. Therefore, a cholesteric LC is useful in various applications, such as a reflection-type polarizer having no loss of light, a brightness enhancement film for a LC display, IR ray shielding film material, and the like.

For visible lights, the reflection wavelength range of a cholesteric LC having a single pitch is less than 150 nm. It has been proved that the reflection wavelength range of a cholesteric LC can be efficiently extended by forming a gradually or heterogeneous pitch distribution in the cholesteric LC. Yuwen CHEN et. al reported in CN1549036A a method, comprising the step of creating a heterogeneous electrical field on an electrode, such that the pitch of the LC near to the electrical field increases and the pitch of the LC far from the electrical field is essentially unchanged, thereby the reflection wavelength range is extended. The defect of said method is that an electrode having a particular shape should be incorporated into a reflection film, which would affect the optical performance of the film. Also, such an electrode is difficult to be processed.

In addition, a macromolecule-stabilized LC, which is formed by stabilizing the crosslinked macromolecule network dispersed in the LC and fixing the alignment of the LC molecules, can provide a desirable macroscopic-alignment distribution of LC molecules. Such a macromolecule-stabilzed LC is a conventional means in the art to obtain a particular pitch distribution of a cholesteric LC. D. J. Broer et. al. (CN1198819A) described a method, including steps of providing a complex material system (comprising a light-polymerizable cholesteric alcohol acrylate, a light-polymerizable nematic alcohol acrylate, a dye) that is polymerizable upon light irradiation, and applying a weak UV irradiation (the luminous intensity is less than 0.05 mW/cm$^2$) to the complex material system, such that the monomers in the system can be dispersed for a sufficient period to form a gradual pitch distribution, thereby a polarizer that can selectively reflect in the whole wavelength range of visible light is obtained. Since the dispersion of the monomer in the LC varies depending upon the intensity of the UV light, the wavelength range obtained through such a method is sensitive to the luminous intensity of the UV irradiation. Thus, during the production process of the polarizer by said method, the polarizer should be tested by a homogeneous light sensor. Once a desired wavelength range is achieved, the luminous intensity of the UV irradiation has to be increased immediately. Thus, a complex apparatus is needed for carrying out said method and the parameters of the process are difficult to be controlled.

SUMMARY OF THE INVENTION

In order to overcome the technical defects existing in the prior art, the present invention provides a liquid crystal film which exhibits a property of broad-band reflection and has a higher reflectivity and a higher transmittance. The liquid crystal film of the present invention is applicable for an industrial development because it can be produced with a simple process and at a lower cost.

The present invention provides a composite material useful for a LC film, wherein the composite material comprises a polymer network of a cholesteric LC material, and a chiral material capable of hydrogen-bond-assisted self-assembly (hereinafter referred to as "HBASA chiral material"), the HBASA chiral material being dispersed in and restrained by the polymer network.

In the present invention, the HBASA chiral material comprises both an H-bond donor and an H-bond acceptor and has a "H-bond breaking temperature" at which at least a part of the H-bonds formed between the H-bond donor and an H-bond acceptor of the HBASA chiral material breaks.

Specifically, the present invention proposes the following technical solutions.

One aspect of the invention provides a LC film comprising a composite material formed upon UV irradiation of a polymerizable composition comprising a photoinitiator, a cholesteric LC material, and a HBASA chiral material, wherein the cholesteric LC material comprises a polymerizable liquid crystal monomer.

Another aspect of the invention provides a method for preparing the LC film including the following steps: providing a composition reaction system containing a polymerizable composition, wherein the composition comprises a photoinitiator, a cholesteric LC material, and a chiral material capable of HBASA, wherein the cholesteric LC material comprises a polymerizable liquid crystal monomer; and irradiating the polymerizable composition with UV lights such that a polymerization reaction of the monomer occurs in the composition reaction system, and gives a composite material.

In the method of the invention, the UV irradiation may be performed preferably for 5-240 min under a wavelength of 365 nm and a luminous intensity of 0.001-100 mW/cm$^2$.

In one embodiment of the method of the invention, the UV irradiation may be performed at a temperature lower than the "H-bond breaking temperature" to carry out the polymerization reaction. As a result of the polymerization reaction, a polymer network is formed, wherein the aforesaid HBASA chiral material is dispersed and constrained in the network. After the polymerization reaction is completed, a LC film is obtained from the composition reaction system. When the resultant LC film is used at a working/operating temperature, which is equal to or higher than the "H-bond breaking temperature", some of the H-bonds of the HBASA chiral material break. As a result of the breaking of the H-bonds, the LC film can exhibit a property of broad-band reflection.

In another embodiment of the method of the invention, the UV irradiation may be performed at a temperature equal to or greater than the H-bond breaking temperature to carry out the polymerization reaction. The polymerization reaction gives a polymer network in which the afore-said HBASA chiral material is dispersed and constrained therein, and at least a part of the H-bonds of the HBASA chiral material break. After the polymerization reaction is completed, the method of the invention further comprises a step of cooling the composition reaction system to a lower temperature than the H-bond breaking temperature, such that at least a part of the broken H-bonds of the HBASA chiral material are self-assembled. Thereby the resultant LC film can exhibit a property of broad-band reflection when it is used at a temperature lower than the H-bond breaking temperature.

Another aspect of the invention provides a temperature-responsive device comprising a LC film that can exhibit a property of broad-band reflection at a temperature equal to or higher than the H-bond breaking temperature.

Still another aspect of the invention provides a circular polarizer prepared from the LC film that can exhibit a property of broad-band reflection at a temperature lower than the H-bond breaking temperature.

BRIEF DESCRIPTION OF THE DRAWINGS

FIG. 1(1) shows that before the polymerization reaction, the composition reaction system has a homogenous pitch distribution (P1) at a temperature lower than the H-bond breaking temperature of the HBASA chiral material. FIG. 1(2) shows that after the polymerization reaction, the composition reaction system has a homogenous pitch distribution (P2) at a temperature equal to or higher than the H-bond breaking temperature of the HBASA chiral material. FIG. 1(3) shows that during the polymerization reaction at a temperature equal to or higher than the H-bond breaking temperature of the HBASA chiral material, a polymer network is formed. The HBASA chiral material is restrained in the polymer network and the H-bonds of the HBASA chiral material are broken. The composition reaction system also has a homogenous pitch distribution (P2). FIG. 1(4) shows that a distribution of different pitches ($P_a$, $P_b$ and $P_c$) of LC film, which is formed after the step as shown in FIG. 1 (3) and is used at a working/operating temperature lower than the H-bond breaking temperature of the HBASA chiral material. Due to the lower or higher extent of the self-assembly of the broken H-bonds of the HBASA chiral material, different pitches ($P_a$, $P_b$ and $P_c$) are presented in the obtained LC film and thereby the LC film exhibits a property of broad-band reflection.

DETAILED DESCRIPTION OF PREFERRED EMBODIMENTS

In the following description, for purposes of explanation and not limitation, specific details are set forth in order to provide a thorough understanding of the present invention. However, it will be apparent to one skilled in the art that the present invention may be practiced in other embodiments. In some instances, detailed descriptions of well-known methods and devices are omitted so as to not obscure the description of the present invention with unnecessary detail. A more complete appreciation of the invention will be readily obtained by reference to the following-described Embodiments and the accompanying drawings, however, the invention is not limited thereto.

The invention provides a LC film comprising a composite material formed upon UV irradiation of a polymerizable composition comprising a photoinitiator, a cholesteric LC material, and a chiral material capable of hydrogen-bond-assisted self-assembly (HBASA), wherein the cholesteric LC material comprises a polymerizable liquid crystal monomer.

The cholesteric LC material is preferably a composition comprising:
  a polymerizable chiral LC monomer of 5-20 weight parts, preferably 10-20 weight parts;
  a small molecular nematic LC of 45-89.5 weight parts, preferably 50-70 weight parts; and
  a chiral additive of 5-30 weight parts, preferably 15-25 weight parts.

The photoinitiator may be presented in an amount of 0.5-5 weight parts, preferably 0.5-1 weight parts.

The polymerizable chiral LC monomer is at least one compound selected from the group consisting of the following members:

-continued

Herein, the term "small molecular nematic LC" refers to a nematic LC that is not a polymer. Typically, the small molecular nematic LC has a relative small molecular weight and can exhibit a nematic LC property under a certain condition. In the present invention, the nematic LC is preferably a mixture of nematic LC compounds. The nematic LC mixture exhibits a low nematic-phase temperature in the range of from −50° C. to 0° C., and a high nematic-phase temperature in the range of from 65° C. to 150° C. Any small molecular nematic LC, which is commercially available, can be used in the present invention, as long as the low nematic-phase temperature and the high nematic-phase temperature are in the range of from −50° C. to 0° C. and from 65° C. to 150° C., respectively. The examples of the small molecular nematic LC include SLC1717, SLC7011-100, E48 and CLO-001. SLC1717 is preferred.

The chiral additive is preferably at least a compound selected from the group consisting of the following members:

-continued

ZLI-4572

ZLI-4571

The photoinitiator is preferably Irgacure651, as represented by the formula:

The cholesteric LC material of the present invention may be prepared by a conventional mixing technique, preferably, a solvent-volatilizing process or a heat-melt process, wherein the above components are mixed together at the ratios as described above. The photoinitiator may be incorporated into the cholesteric LC material during the cholesteric LC material is formulated.

The HBASA chiral material comprises both an H-bond donor and an H-bond acceptor. At least one of the H-bond donor and an H-bond acceptor is a chiral material. Both of the H-bond donor and the H-bond acceptor may be the chiral materials. And the chiral configuration of both the H-bond donor and the H-bond acceptor may be the same or different with each other. Alternatively, one of the H-bond donor and the H-bond acceptor is a chiral material, and the other is not a chiral material.

The H-bonds formed between the H-bond donor and the H-bond acceptor as described above can be broken under a certain temperature range.

For example, in the present invention, the H-bond donor is preferably at least one member selected from the group consisting of the following compounds:

CHG

-continued

YXG

YSLG

LBFG

LBDG

The H-bond acceptor is preferably at least one member selected from the group consisting the following compounds:

CBS

BTS

WJHS

WJFS

In the present invention, the HBASA chiral material comprises the H-bond donor and the H-bond acceptor at a ratio by mole of the H-bond donor to the H-bond acceptor in the range of 1: (1.2-2.2).

According to the present invention, the ratio by mass of the cholesteric LC material to the HBASA chiral material to formulate the polymerizable composition may be in the range of (4-20): 1.

The reflection wavelength range of the LC film may be controlled by adjusting the types of the HBASA chiral material and the amount thereof. Preferably, the reflection wave range is in the range of 300 nm-2200 nm, preferably 350 nm-750 nm.

The LC film can exhibit a property of broad-band reflection at its working/operating temperature. When the LC film is obtained by performing the polymerization with UV irradiation at a temperature lower than the H-bond breaking temperature, the result LC film is preferably used at a working/operating temperature which is equal to or higher than the H-bond breaking temperature of the HBASA chiral material. Similarly, when the LC film is obtained by performing the polymerization with UV irradiation at a temperature equal to or higher than the H-bond breaking temperature, the result LC film is preferably used at a working/operating temperature which is lower than the H-bond breaking temperature of the HBASA chiral material.

According to the present invention, the composition reaction system has a homogeneous pitch distribution (P1) before the polymerization and without breaking the H-bonds of the HBASA chiral material. The composition reaction system has a homogeneous pitch distribution (P2) after the polymerization and breaking the H-bonds of the HBASA chiral material. Since the helixical twisted force of the HBASA chiral material before the H-bond is broken is different from that after the H-bond is broken, the composition reaction system exhibits different pitches before and after the H-bond is broken. When a polymerization reaction occurs in the composition reaction system, a polymer network is formed; thereby the pitches (P1) of the composition reaction system before the H-bond is broken and the pitches (P2) after the H-bond is broken are anchored by the polymer network. Since the HBASA chiral materials are distributed far or near the polymer network, the anchoring forces of the polymer network to each of the HBASA chiral materials are different.

For example, in the event where the HBASA chiral material is relative close to the polymer network, the anchoring force of the polymer network to said HBASA chiral material is strong. When external environment is changed (such as cooling), the broken H-bonds of the HBASA chiral material near to polymer network cannot be self-assembled easily due to the strong anchoring force of the polymer network, thus, the pitch would vary slightly. In another aspect, if the HBASA chiral material is relative far from the polymer network, the anchoring force of the polymer network to said HBASA chiral material is weak. When external environment is changed (such as cooling), the broken H-bonds of the HBASA chiral material far from the polymer network can be self-assembled easily due to the weak anchoring force of the polymer network, thus, the pitch would vary greatly. Thereby, the resultant LC film would exhibit a heterogeneous pitch distribution.

Similarly, in the event where the polymerization is performed at a temperature lower than the H-bond breaking temperature, when the resultant LC film is heated to a temperature equal to or higher than the H-bond breaking temperature, the H-bonds near to the polymer network may much more easily break than those far away from the polymer network. As a result of the variance in the extent of H-bond breaking at different locations of the polymer network, the resultant LC film would exhibit a heterogeneous pitch distribution and thereby exhibit a property of broad-band reflection.

In one embodiment of the invention, the H-bond breaking temperature of the composition reaction system is firstly measured, then an UV irradiation is applied to the composition reaction system under a temperature equal to or greater than the H-bond breaking temperature, such that a polymerization reaction occurs in the composition reaction system to form a polymer network, thereby the HBASA chiral material is anchored to some extent within the network to form a composite material. The resultant LC film comprising the composite material exhibits a pitch (P2). When the LC film comprising the composite material is cooled to a temperature lower than the H-bond breaking temperature, the broken H-bonds of the HBASA chiral material relatively far from the polymer network will proceed to self-assembly due to the weak anchoring force of the polymer network to the HBASA chiral material, resulting in a great change in pitch ($P_c$). The broken H-bonds the HBASA chiral material relatively close to the polymer network are maintained due to the strong anchoring force of the polymer network to the HBASA chiral material, resulting in slight change in pitch ($P_a$). With respect to the HBASA chiral material located neither far from nor close to the polymer network, a pitch of $P_b$, which is greater than $P_c$ but smaller than $P_a$, is exhibited. As a result of a heterogeneous pitch distribution, the LC film can exhibit a property of broad-band reflection at a temperature lower than the H-bond breaking temperature.

The present invention further provides a method for preparing a LC film including the steps of: mixing a cholesteric LC material, a HBASA chiral material and a photoinitiator so as to form a composition reaction system wherein the cholesteric LC material comprises a polymerizable LC monomer; and then applying an UV irradiation to the composition reaction system such that a polymerization reaction occurs in the composition reaction system.

In one embodiment of the invention, the UV irradiation is performed under a wavelength of 365 nm with a luminous intensity of 0.001-100 mW/cm². The UV irradiation may be performed for 5-240 min. The UV irradiation is preferably performed under a luminous intensity of 1.2-3.3 mW/cm² for 18-30 min, more preferably under a luminous intensity of 1.2 mW/cm² for 30 min.

According to the method as described above, the UV irradiation may be performed under a temperature lower or a high than the H-bond breaking temperature, depending upon the intended application of the LC film. For example, if the LC film is used at a lower temperature than the H-bond breaking temperature, the UV irradiation may be performed under a temperature high than the H-bond breaking temperature such that the LC film can exhibit a property of broad-band reflection at a working/operating temperature lower than the H-bond breaking temperature.

In another embodiment of the invention, the composition reaction system is subjected to an UV irradiation under a temperature lower than the H-bond breaking temperature to form a polymer network without accompanying of H-bonds breaking of HBASA chiral material. After the polymerization, the pitch of the composition reaction system is fixed as P1. When the LC film is used at a working/operating temperature equal to or greater than the H-bond breaking temperature, the H-bonds relatively far from the polymer network in the system are broken, and the H-bonds relatively close to the polymer network in the system are maintained. Thereby, an LC film that can exhibit a property of broad-band reflection at the working/operating temperature higher than the H-bond breaking temperature is obtained.

The present invention further provides a temperature-responsive device (also called as an "intellegent temperature-responsive device"), comprising the LC film that can exhibit a property of broad-band reflection at a temperature higher than the H-bond breaking temperature. If the device can only reflect the light corresponding to a single pitch, the device would indicate that the environmental temperature is lower than the H-bond breaking temperature. If the device can reflect lights corresponding to pitches varying in a certain range, the device would indicate that the environmental temperature is equal to or greater than the H-bond breaking temperature. Therefore, such a device can be used in the application where an environmental temperature greater than the H-bond breaking temperature is needed to be monitored.

The present invention further provides a circular polarizer prepared from the LC film that can exhibit a property of broad-band reflection at a working/operating temperature which is lower than the H-bond breaking temperature. The circular polarizer of the present invention can be used as an LC element, such as a reflection-type circular polarizer having less loss of light, a brightness enhancement film for a LC display, and the like.

The LC film of the present invention has various advantages. It can be prepared by a relatively simple process at a lower cost and from easily obtainable raw materials. The method for preparing the LC film requires a lower UV luminous intensity, and thus allows a large scale of industry production. The obtained LC film can exhibit a high reflectivity and a high transmittance as well as a broad reflection wave range.

EXAMPLE

The invention is described in detail with reference to the following specific examples, which are not intended to limit the scope of the invention.

Measuring Method

Measuring LC Phase Transition Temperature

The LC phase transition temperature is measured for LC monomers and mixtures thereof by using Perkin Elmer Pyris 6 as a Differential Scanning calorimeter. The sample was placed into a crucible, tabletted and then measured. The measurement was performed under high-purity $N_2$ atmosphere. The temperature varied at 10° C. min$^{-1}$ during the scanning. The LC phase state and phase transition temperature of the LC monomer and the mixture thereof were determined by using an Olympus BX51 polarizing microscope provided with a Linkam THMS-600 heating stage.

Measuring the Spectral Characteristic of LC

The spectrum diagram of a LC film was obtained by using an UV/visible light/near infrared spectrophotometer (Jasco V570), and the reflection wave range and the transmittance data were obtained from the spectrum diagram.

Structure and Synthesis Procedure of the Raw Material

1. CHG

See the reference: Christensen J B. A simple method for synthesis of active esters of isonicotinic and picolinic acids [J]. Molecules, 2001, 6: 47-51.

2. CBS, WHJHS, and WJFS

A general synthesis procedure for preparing the CBS, WHJHS, or WJFS is as follows:

wherein X, Y may be H or F.

Specifically, taking CBS as an example, the synthesis procedure for preparing the same is described below:

15.5 g (0.1 mol) 2,6-difluoro-4-hydroxybenzonitrile was dissolved into the 100 mL of an aqueous solution of 10 wt % NaOH, then heated to reflux. As a result of the hydrolysis of 2,6-difluoro-4-hydroxybenzonitrile, $NH_3$ gas is emitted. A pH paper was used for monitoring the process of the hydrolysis reaction, until no $NH_3$ gas was produced. The obtained mixture was cooled and then the pH of the mixture was adjusted with a diluted hydrochloric acid until a pH value of about 2 was obtained. Subsequently, the mixture was cooled to about 0° C., thereby white solids were precipitated. The precipitated solids were collected by using a pump filter and recrystallized in 50% ethanol. Thereby a white solid A was obtained. Next, 2.8 g (50 mmol) KOH, 0.5 g KI, 4.35 g (25 mmol) solid A and 6.1 g (50 mmol) 1-bromhexane were added into a three-neck flask charged with 100 mL of 80% v/w ethanol. The mixture was refluxed for 12 h and the majority of the ethanol was removed from the mixture by a distillation at an atmosphere pressure. The heating is ceased. The mixture was poured into a cold deionized water to quench the reaction, and then the pH of the mixture was adjusted with the diluted hydrochloric acid until the pH value of about 3 was obtained. Thereby a large amount of white solids was precipitated. The precipitated solids were collected by using a pump filter and recrystallized in 70% ethanol to give a white crystal. The obtained white crystal is the compound CBS.

3. Other raw materials which are commercially available are listed in the following table:

| | |
|---|---|
| SLC1717 | Slichem Shijiazhuang Chengzhi Yonghua Display Materials Co., Ltd. |
| SLC7011-100 | Slichem Shijiazhuang Chengzhi Yonghua Display Materials Co., Ltd. |
| E48 | MERCK |
| CLO-001 | Slichem Shijiazhuang Chengzhi Yonghua Display Materials Co., Ltd. |
| S811 (laevo) | MERCK |
| R811 (dextro) | MERCK |
| ZLI-4571 (laevo) | MERCK |
| ZLI-4572(dextro) | MERCK |
| Irgacure651 | Jingjiang Hongtai Chemical Engineering Co., Ltd. |

| | |
|---|---|
| BTS: | TCI Chemicals (Shanghai) Development Co., Ltd. |
| LBDG: | TCI Chemicals (Shanghai) Development Co., Ltd. |

CHG

See the reference: Christensen J B. A simple method for synthesis of active esters of isonicotinic and picolinic acids [J]. Molecules, 2001, 6: 47-51.

LBFG

See the reference: Symmetric bi-pyridyl banana-shaped molecule and its intermolecular hydrogen bonding liquid-crystalline complexes By: Sui, Dan; Hou, Qiufei; Chai, Jia; Ye, Ling; Zhao, Liyan; Li, Min; Jiang, Shimei, From Journal of Molecular Structure (2008), 891(1-3), 312-316

YSLG

See the reference: Grosshans, Philippe; Comptes Rendus Chimie 2004, V7(2), P189-196.

YXG

See the reference: 4-Alkyloxy-4'-stilbazoles. New heterocyclic mesogens. By Bruce, Duncan W.; Dunmur, David A.; Lalinde, Elena; Maitlis, Peter M.; Styring, Peter. From Liquid Crystals (1988), 3(3), 385-95.

Ch1

See the reference: Synthesis and photopolymerization of cholesteric liquid crystalline diacrylates By Lub, J.; Broer, D. J.; Hikmet, R. A. M.; Nierop, K. G. J. From Liquid Crystals (1995), 18(2), 319-26.

5CBB

See the references:
[1] Brodzik, M.; Dabrowski, R.; Przedmojski, J. Induction of smectic Ad phase in polar systems of nCBB-nCB. Journal de Physique II (1995), 5(12), 1805-17.
[2] Pyc K and Dabrowski R, BmII WA T. 35 (1986) 401.

See reference: Broer D J, Boven J, Mol G N. In-situ photopolymerization of oriented liquid-crystalline acrylates, 3. oriented polymer networks from a mesogenic diacrylate [J]. Die Makromolekulare Chemie, 1989, 190(9): 2255-2268.

Example 1

Preparation of a LC Film Having a Broad Wavelength Reflection Property at a Temperature Lower than the H-Bond Breaking Temperature 1) Preparing a cholesteric LC material: Ch1 as the polymerizable chiral LC monomer (8 parts), SLC1717 as the small molecular nematic LC (70 parts), 5CBB as the chiral additive (8 parts), ZLI-4572 as the chiral additive (13.5 parts) and Irg651 (Irgacure651) as the photoinitiator (0.5 parts) were sufficiently mixed. The cholesteric LC material was obtained by a heat-melt process

2) CBS as the H-bond acceptor and CHG as the H-bond donor were mixed at 1: 1.3 by mole thereby obtaining a HBASA chiral material. Then the HBASA chiral material was mixed with the cholesteric LC material obtained in step 1) at 1:15 by mass so as to form a composition reaction system.

The components used in steps 1) and 2) were as below:
the polymerizable chiral LC monomer:

Ch1 the small molecular nematic LC: SLC1717
chiral additivess:

5CBB

ZL1-4572 the photoinitiator

Irg651 the H-bond acceptor,

CBS the H-bond donor,

CHG

Figure 1:
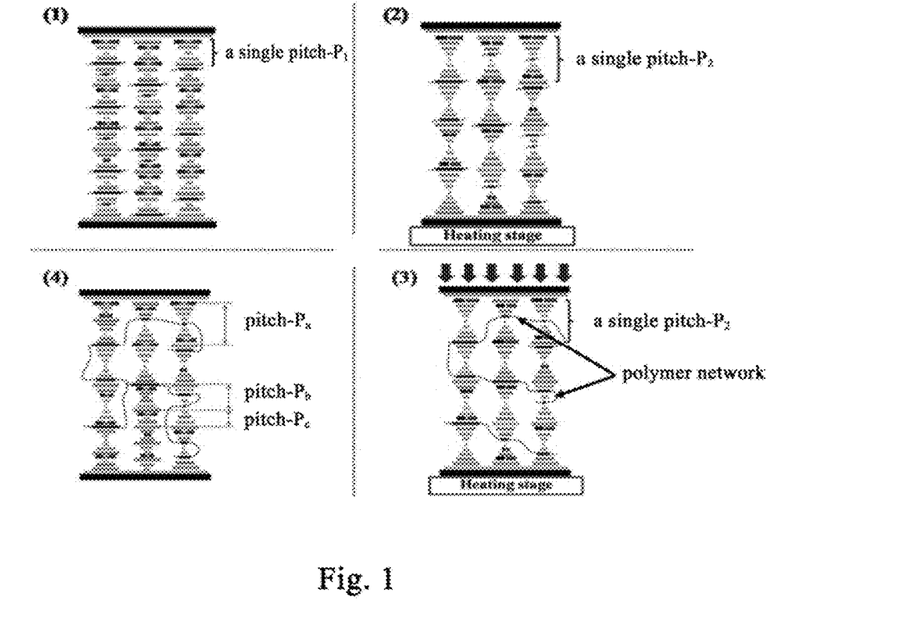
FIG. 1 is a schematic flowchart for preparing the LC film according to the present invention. The LC film is obtained by UV irritation of a polymerizable composition at a temperature higher than the H-bond breaking temperature of the HBASA chiral material.
Figure 2:
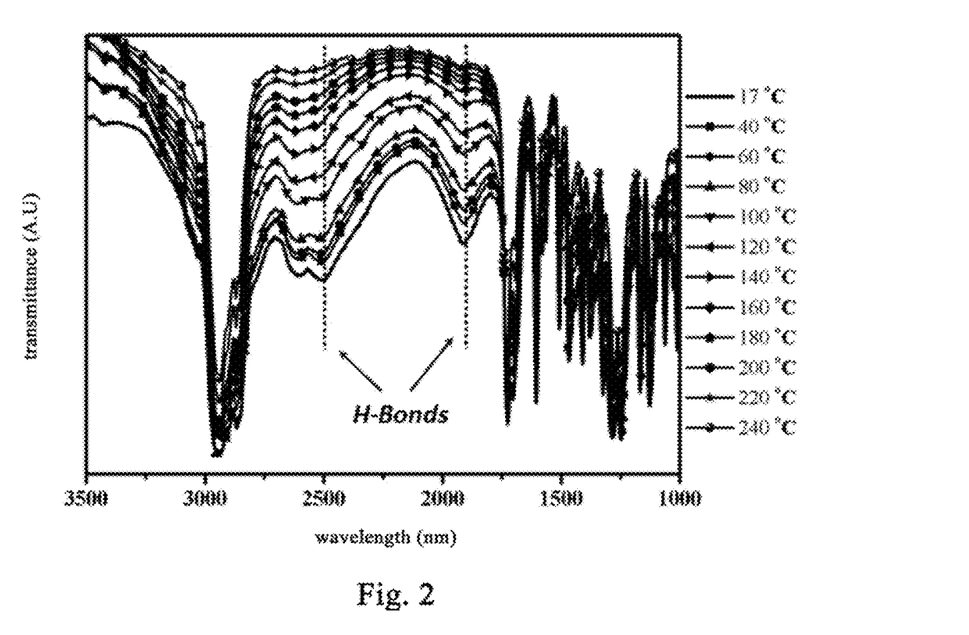
FIG. 2 is a spectrogram of the composition reaction system employed in Example 1. The spectrogram is obtained by a temperature-dependent FTIR.

3) The composition reaction system was measured by temperature-dependent FTIR. The obtained spectrogram was shown in FIG. 2. According to the spectrogram in FIG. 2, the H-bond breaking temperature of the composition reaction system was 220° C. (T1).

4) Polymerizing under the temperature (T1)

The composition reaction system was added into a LC cell, and placed on a heating stage. The temperature of the heating stage was controlled to be equal to the above temperature (T1), and a UV irradiation was applied at a wavelength of 365 nm and a luminous intensity of 1.2 mW/cm² for 30 min. Thereby the LC polymerizable monomers in the composition reaction system were polymerized to form a polymer network.

5) The LC cell was cooled to 25° C., which is lower than T1. Thereby, a LC film with a reflection wave range of 400-800 nm at the temperature was obtained. The reflection spectrum of the LC film was shown in FIG. 3.

Example 2

Preparation of a LC Film Having a Broad Wavelength Reflection Property at a Temperature Lower than the H-Bond Breaking Temperature The LC film having a property of broad-band reflection at a temperature lower than the H-bond breaking temperature was prepared in the similar manner to the Example 1, except that:

In step 1), the cholesteric LC material comprises Ch1 as the polymerizable chiral LC monomer (8 parts), SLC1717 as the small molecular nematic LC (70 parts), CB15 as the chiral additive (9.5 parts), ZLI-4571 as the chiral additive (12 parts) and Irg651 as the photoinitiator (0.5 parts);

In step 2), CBS as the H-bond acceptor and CHG as the H-bond donor were uniformly mixed at 1:1.5 by mole, thereby obtaining a HBASA chiral material. Then the HBASA chiral material was mixed with the cholesteric LC material obtained in the step 1) at 1:18 by mass so as to form a composition reaction system;

In step 3), the H-bond breaking temperature of the composition reaction system was 200° C.;

In step 4), the UV irradiation was applied at a wavelength of 365 nm and a luminous intensity of 2 mW/cm² for 25 min;

The LC cell was cooled to 25° C., which is lower than 200° C. Thereby, a LC film with a reflection wavelength range of 400-550 nm at the temperature was obtained.

Example 3

Preparation of a LC Film Having a Property of Broad-Band Reflection at a Temperature Lower than the H-Bond Breaking Temperature The LC film having a property of broad-band reflection at a temperature lower than the H-bond breaking temperature was prepared in the similar manner to the Example 1, except that:

In step 1), the cholesteric LC material comprises Ch1 as the polymerizable chiral LC monomer (15 parts), SLC1717 as the small molecular nematic LC (15 parts), 5CBB as the chiral additive (15 parts), ZLI-4572 as the chiral additive (15 parts) and Irg651 as the photoinitiator (15 parts);

In step 2), BTS as the H-bond acceptor and YXG as the H-bond donor were uniformly mixed at 1:1.7 by mole, thereby obtaining a HBASA chiral material. Then the HBASA chiral material was mixed with the cholesteric LC material obtained in the step 1) at 1:15 by mass so as to form a composition reaction system;

In step 3), the H-bond breaking temperature of the composition reaction system was 240° C.;

In step 4), the UV irradiation was applied at a wavelength of 365 nm and a luminous intensity of 3.3 mW/cm² for 18 min;

The LC cell was cooled to 25° C., which is lower than 240° C. Thereby, a LC film with a reflection wavelength range of 900-1200 nm at the temperature was obtained.

Example 4

Preparation of a LC Film Having a Property of Broad-Band Reflection at a Temperature Lower than the H-Bond Breaking Temperature The LC film having a property of broad-band reflection at a temperature lower than the H-bond breaking temperature was prepared in the similar manner to the Example 1, except that:

In step 1), the cholesteric LC material comprises Ch1 as the polymerizable chiral LC monomer (15 parts), SLC1717 as the small molecular nematic LC (67.3 parts), 5CBB as the chiral additive (5 parts), ZLI-4572 as the chiral additive (12 parts) and Irg651 as the photoinitiator (0.7 parts);

In step 2), WJHS as the H-bond acceptor and YXG as the H-bond donor were uniformly mixed at 1:1.8 by mole, thereby obtaining a HBASA chiral material. Then the HBASA chiral material was mixed with the cholesteric LC material obtained in the step 1) at 1:15 by mass so as to form a composition reaction system;

In step 3), the H-bond breaking temperature of the composition reaction system was 190° C.;

In step 4), the UV irradiation was applied at a wavelength of 365 nm and a luminous intensity of 3.3 mW/cm² for 18 min;

The LC cell was cooled to 25° C., which is lower than 190° C. Thereby, a LC film with a reflection wavelength range of 800-1000 nm at the temperature was obtained.

When the LC film obtained in each of Examples 1-4 is used as a circular polarizer according to a conventional process in the art, it behaves as a reflection-type circular polarizer having no light loss.

Figure 3:
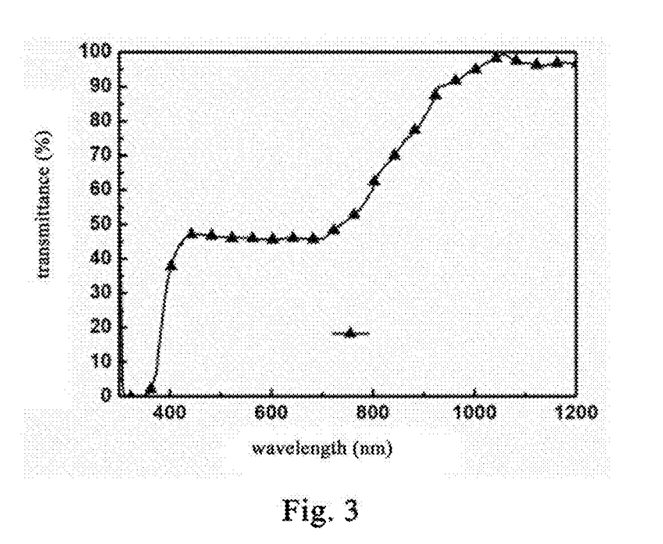
FIG. 3 is a reflection spectrum of the LC film prepared in Example 1.

The reflection wavelength range and the transmittance of the LC film obtained in example 1 is shown in FIG. 3, wherein the transmittance of the film in the reflection wavelength range of 400-800 nm is about 47%, close to 50%.

Example 5

Preparation of a LC Film Having a Property of Broad-Band Reflection at a Temperature Equal to or Greater than the H-Bond Breaking Temperature 1) Preparing a cholesteric LC material: Ch2 as the polymerizable chiral LC monomer (18 parts), SLC1717 as the small molecular nematic LC (59 parts), 5CBB as the chiral additive (7 parts), ZLI-4572 as the chiral additive (15 parts) and Irg651 (Irgacure651) as the photoinitiator (1 parts) were sufficiently mixed. The cholesteric LC material was obtained by a heat-melt process.

2) BTS as the H-bond acceptor and CHG as the H-bond donor were mixed at 1:1.5 by mole thereby obtaining a HBASA chiral material. Then the HBASA chiral material was mixed with the cholesteric LC material obtained in the step 1) at 1:19 by mass so as to form a composition reaction system.

The components used in steps 1) and 2) were as below:
the polymerizable chiral LC monomer:

Ch2 the small molecular nematic LC: SLC1717
chiral additives:

5CBB

ZL1-4572 the photoinitiator the H-bond acceptor, the H-bond donor,

3) The H-bond breaking temperature of the composition reaction system was measured by temperature-dependent FTIR. As a result, the H-bond breaking temperature of the composition reaction system was 250° C. (T1).

4) Polymerizing under the temperature (T1)

A UV irradiation was applied to the composition reaction system at a wavelength of 365 nm and a luminous intensity of 1.2 mW/cm² for 30 min such that the LC polymerizable monomers in the composition reaction system were polymerized to form a polymer network.

Figure 4:
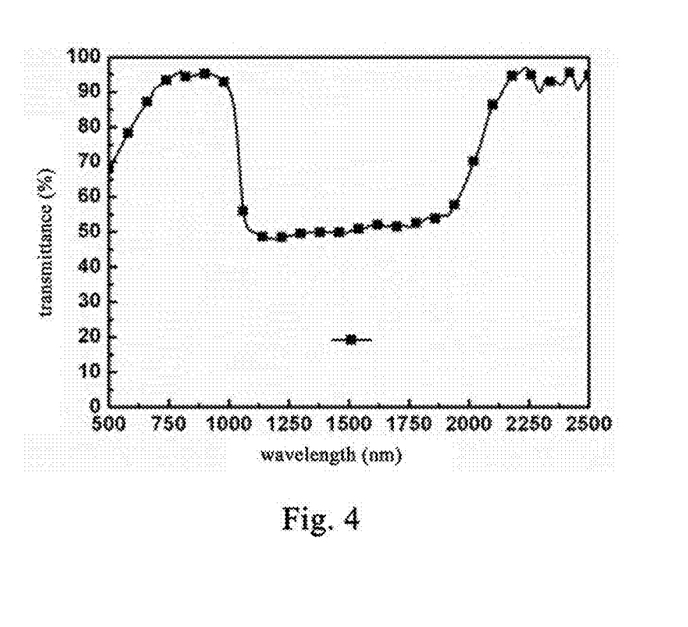
FIG. 4 is a reflection spectrum of the LC film prepared in Example 5.

5) The system obtained in step 4) was heated to a temperature greater than T1. Since CHG and BTS were presented far from or near to the polymer network, the H-bonds formed between CHG and BTS were broken or maintained in the different locations of the polymer network. Thereby, a LC film with a reflection wavelength range of 1000 nm-2000 nm at the temperature was obtained. The reflection spectrum of the LC film was shown in FIG. 4.

Example 6

Preparation of a LC Film Having a Property of Broad-Band Reflection at a Temperature Equal to or Greater than the H-Bond Breaking Temperature The LC film having a property of broad-band reflection at a temperature equal to or greater than the H-bond breaking temperature was prepared in the similar manner to the Example 5, except that:

In step 1), the cholesteric LC material comprises Ch2 as the polymerizable chiral LC monomer (14 parts), SLC1717 as the small molecular nematic LC (63 parts), S811 as the chiral additive (22 parts) and Irg651 as the photoinitiator (1 parts); and the cholesteric LC material was obtained by a heat-melt process;

In step 2), BTS as the H-bond acceptor and CHG as the H-bond donor were uniformly mixed at 1:1.5 by mole, thereby obtaining a HBASA chiral material. Then the HBASA chiral material was mixed with the cholesteric LC material obtained in the step 1) at 1:13 by mass so as to form a composition reaction system;

In step 3), the H-bond breaking temperature of the composition reaction system was 250° C.;

In step 4), the UV irradiation was applied at a wavelength of 365 nm and a luminous intensity of 2.2 mW/cm² for 20 min;

The LC cell was cooled to 25° C., which is lower than 250° C. Thereby, a LC film with a reflection wavelength range of 800 nm-1000 nm at the temperature was obtained.

Example 7

Preparation of a LC Film Having a Property of Broad-Band Reflection at a Temperature Equal to or Greater than the H-Bond Breaking Temperature The LC film having a property of broad-band reflection at a temperature equal to or greater than the H-bond breaking temperature was prepared in the similar manner to the Example 5, except that:

In step 1), the cholesteric LC material comprises Ch2 as the polymerizable chiral LC monomer (20 parts), SLC1717 as the small molecular nematic LC (51.5 parts), S811 as the chiral additive (28 parts) and Irg651 as the photoinitiator (0.5 parts); and the cholesteric LC material was obtained by a heat-melt process;

In step 2), BTS as the H-bond acceptor and YSLG as the H-bond donor were uniformly mixed at 1:1.6 by mole, thereby obtaining a HBASA chiral material. Then the HBASA chiral material was mixed with the cholesteric LC material obtained in the step 1) at 1:12 by mass so as to form a composition reaction system;

In step 3), the H-bond breaking temperature of the composition reaction system was 170° C.;

In step 4), the UV irradiation was applied at a wavelength of 365 nm and a luminous intensity of 2.2 mW/cm² for 20 min;

The LC cell was cooled to 25° C., which is lower than 170° C. Thereby, a LC film with a reflection wavelength range of 800 nm-1000 nm at the temperature was obtained.

Example 8

Preparation of a LC Film Having a Property of Broad-Band Reflection at a Temperature Equal to or Greater than the H-Bond Breaking Temperature The LC film having a property of broad-band reflection at a temperature equal to or greater than the H-bond breaking temperature was prepared in the similar manner to the Example 5, except that:

In step 1), the cholesteric LC material comprises Ch2 as the polymerizable chiral LC monomer (8 parts), SLC1717 as the small molecular nematic LC (74.5 parts), S811 as the chiral additive (17 parts) and Irg651 as the photoinitiator (0.5 parts); and the cholesteric LC material was obtained by a heat-melt process;

In step 2), BTS as the H-bond acceptor and LBDG as the H-bond donor were uniformly mixed at 1:2.1 by mole, thereby obtaining a HBASA chiral material. Then the HBASA chiral material was mixed with the cholesteric LC material obtained in the step 1) at 1:16 by mass so as to form a composition reaction system;

In step 3), the H-bond breaking temperature of the composition reaction system was 260° C.;

In step 4), the UV irradiation was applied at a wavelength of 365 nm and a luminous intensity of 1.2 mW/cm² for 30 min;

The LC cell was cooled to 25° C., which is lower than 260° C. Thereby, a LC film with a reflection wave range of 800 nm-1000 nm at the temperature was obtained.

The LC film obtained in each of Examples 5-8 can be used for an intelligent temperature-responsive device according to a conventional process in the art. If the device is put into operation, when light is reflected at a single pitch, the device would send a signal to indicate that the environmental temperature is lower than the H-bond breaking temperature; and when the light is reflected at pitches varying in a certain range, the device would send a signal to indicate that the environmental temperature is greater than the H-bond breaking temperature. Therefore, such a device can be used for measuring environmental temperature in the case where the temperature greater than the H-bond breaking temperature is needed to be monitored.

For example, the LC film obtained in example 8 was configured into an intellectual temperature-responsive device, wherein the H-bond breaking temperature is 260° C. Such a device can be used for indicating the environmental temperature. When the surrounding temperature is equal to or greater than 260° C., a pre-set signal would be sent from the device to give an alarm to the operators, such that the operators can perform necessary operations in time.

The present invention has been described in detail with reference to the embodiments and general description for the purposes of explanation. However, it will be apparent to one skilled in the art that various modifications or alternations may be made to the present invention without departing from the scope and spirit of the invention. Thus the modifications or alternations are included within the scope of the invention.

The invention claimed is:

1. A liquid crystal film comprising a composite material formed upon UV irradiation of a polymerizable composition comprising a photoinitiator, a cholesteric LC material, and a hydrogen-bond-assisted self-assembly (HBASA) chiral material;

wherein the cholesteric LC material is a composition comprising:
a polymerizable chiral LC monomer of 5-20 weight parts,
a small molecular nematic LC of 65-90 weight parts, and
a chiral additive of 5-15 weight parts;
the amount of the photoinitiator is 0.5-5 weight parts; and
the ratio by mass of the cholesteric LC material to the HBASA chiral material is in the range of (4-20): 1.

2. The liquid crystal film of claim 1, wherein the polymerizable chiral LC monomer is at least one compound selected from the group consisting of the following members:

3. The liquid crystal film of claim 1, wherein the small molecular nematic LC is selected from the group consisting of SLC1717, SLC7011-100, E48 and CLO-001.

4. The liquid crystal film of claim 1, wherein the chiral additive is at least a compound selected from the group consisting of the following members:

5. The liquid crystal film of claim 1, wherein the photoinitiator is Irgacure651.

6. The liquid crystal film of claim 1, wherein the HBASA chiral material comprises both an H-bond donor and an H-bond acceptor.

7. The liquid crystal film of claim 6, wherein the H-bond donor is at least one member selected from the group consisting of the following compounds:

CHG

YXG

YSLG

LBFG

LBDG

8. The liquid crystal film of claim 6, wherein the H-bond acceptor is at least one member selected from the group consisting the following compounds:

CBS

BTS

WJHS

WJFS

9. The liquid crystal film of claim 6, wherein the ratio by mole of the H-bond donor to the H-bond acceptor is in the range of 1: (1.2-2.2).

10. The liquid crystal film of claim 1, wherein the liquid crystal film can exhibit a property of broad-band reflection at a working/operating temperature lower than the H-bond breaking temperature of the HBASA chiral material or at a working/operating temperature equal to or greater than the H-bond breaking temperature of the HBASA chiral material.

11. A method for preparing a liquid crystal film, wherein the method includes the following steps:
   providing a composition reaction system containing a polymerizable composition, wherein the composition comprises a photoinitiator, a cholesteric LC material, and a chiral material capable of hydrogen-bond-assisted self-assembly (HBASA); and
   applying a UV irradiation to the polymerizable composition such that a polymerization reaction of the monomer occurs in the composition reaction system;
   wherein the cholesteric LC material is a composition comprising:
      a polymerizable chiral LC monomer of 5-20 weight parts,
      a small molecular nematic LC of 65-90 weight parts, and
      a chiral additive of 5-15 weight parts;
   the amount of the photoinitiator is 0.5-5 weight parts; and
   the ratio by mass of the cholesteric LC material to the HBASA chiral material is in the range of (4-20): 1.

12. The method of claim 11, wherein the UV irradiation is performed for 5-240 min under a wavelength of 365 nm with a luminous intensity of 0.001-100 mW/cm$^2$.

13. The method of claim 11, wherein the UV irradiation is performed at a temperature lower than the H-bond breaking temperature of the HBASA chiral material.

14. The method of claim 13, wherein when a liquid crystal film formed by the method is heated to a temperature such that at least a part of H-bonds of the HBASA chiral material break, the liquid crystal film can exhibit a property of broad-band reflection.

15. The method of claim 11, wherein the UV irradiation is performed at a temperature equal to or greater than the H-bond breaking temperature of the HBASA chiral material such that at least a part of H-bonds of the HBASA chiral material break, and the method further comprises a step of cooling the composition reaction system to a temperature lower than the H-bond breaking temperature of the HBASA chiral material, such that at least a part of the broken H-bonds of the chiral material are self-assembled, thereby a LC film that can exhibit a property of broad-band reflection at a temperature lower than the H-bond breaking temperature of the HBASA chiral material is obtained.

16. A temperature-responsive device, wherein the device comprises a liquid crystal film, wherein the liquid crystal film comprises a composite material formed upon UV irradiation of a polymerizable composition comprising a photoinitiator, a cholesteric LC material, and a chiral material capable of hydrogen-bond-assisted self-assembly (HBASA),
  wherein the liquid crystal film can exhibit a property of broad-band reflection at a temperature equal to or higher than the H-bond breaking temperature of the HBASA chiral material;
  wherein the cholesteric LC material is a composition comprising:
    a polymerizable chiral LC monomer of 5-20 weight parts,
    a small molecular nematic LC of 65-90 weight parts, and
    a chiral additive of 5-15 weight parts;
  the amount of the photoinitiator is 0.5-5 weight parts; and
  the ratio by mass of the cholesteric LC material to the HBASA chiral material is in the range of (4-20): 1.

17. A circular polarizer, wherein the circular polarizer is prepared from a liquid crystal film, wherein the liquid crystal film comprises a composite material formed upon UV irradiation of a polymerizable composition comprising a photoinitiator, a cholesteric LC material, and a chiral material capable of hydrogen-bond-assisted self-assembly (HBASA),
  wherein the liquid crystal film can exhibit a property of broad-band reflection at a temperature lower than the H-bond breaking temperature of the HBASA chiral material;
  wherein the cholesteric LC material is a composition comprising:
    a polymerizable chiral LC monomer of 5-20 weight parts,
    a small molecular nematic LC of 65-90 weight parts, and
    a chiral additive of 5-15 weight parts;
  the amount of the photoinitiator is 0.5-5 weight parts; and
  the ratio by mass of the cholesteric LC material to the HBASA chiral material is in the range of (4-20): 1.

18. A composite material useful for a liquid crystal film, wherein the composite material comprises a chiral material capable of hydrogen-bond-assisted self-assembly (HBASA) and a polymer network of a cholesteric LC material, and the HBASA chiral material is dispersed in and restrained by the polymer network;
  wherein the cholesteric LC material is a composition comprising:
    a polymerizable chiral LC monomer of 5-20 weight parts,
    a small molecular nematic LC of 65-90 weight parts, and
    a chiral additive of 5-15 weight parts;
  the amount of the photoinitiator is 0.5-5 weight parts; and
  the ratio by mass of the cholesteric LC material to the HBASA chiral material is in the range of (4-20): 1.

* * * * *